J. BEACH.
Harvesters.

No. 146,161.  Patented Jan. 6, 1874.

Witnesses.
Chas. G. Wilson
W. E. Chaffee

Inventor:
John Beach
by his attys.
Cox and Cox

UNITED STATES PATENT OFFICE.

JOHN BEACH, OF CRUMB HILL, NEW YORK.

IMPROVEMENT IN HARVESTERS.

Specification forming part of Letters Patent No. 146,161, dated January 6, 1874; application filed June 2, 1873.

*To all whom it may concern:*

Be it known that I, JOHN BEACH, of Crumb Hill, Madison county, New York, have invented a new and useful Improvement in Mowing-Machines, of which the following is a specification, reference being had to the accompanying drawings:

The invention relates to mowing-machines; and consists in providing such a machine with a wheel having on its periphery a serpentine cam, a side ratchet being attached to the wheel, which is mounted loosely upon the shaft of the driving and supporting wheels, and has between it and the driving-wheel a double-ratchet wheel fixed to the axle, and acted upon by a pawl attached to the cam-wheel. A helical spring, placed about the axle, is employed to hold the cam-wheel in position, said spring being furnished with a shipping-fork, by the operation of which the cam-wheel is thrown into or out of gear.

Figure 1:
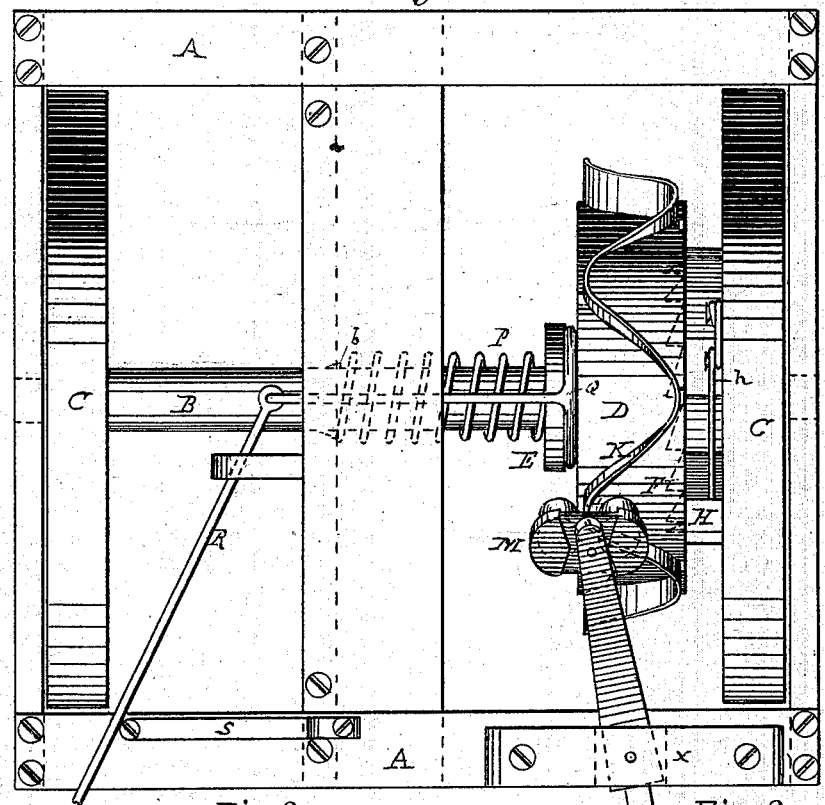
Figure 2:
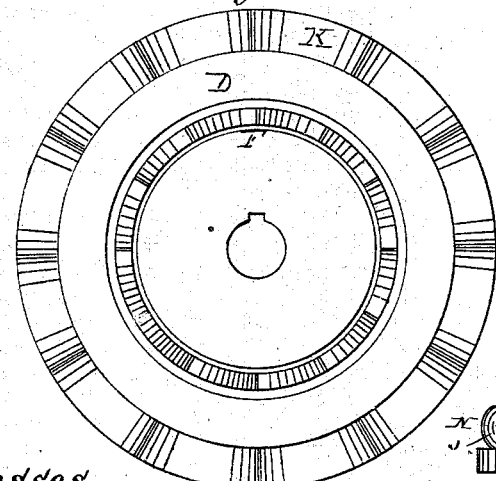
Figure 3:
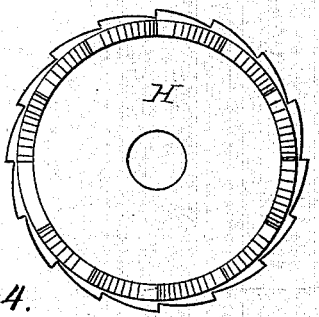
Figure 4:

Figure 1 is a plan view of a device embodying my invention. Fig. 2 is a view of the wheel D. Fig. 3 is a view of the wheel H. Fig. 4 is a view of the head M and its parts.

A is the frame, which is of usual construction, to which is secured the axle B of the traveling wheels C. On that side of the axle B adjacent to the cutting mechanism is placed the wheel D, constructed so as to turn freely when out of gear. The side of the wheel D that is toward the middle of the axle B is provided with the grooved projection E, the office of which will be explained. That side of the wheel D that is removed from the middle of the axle B contains a side ratchet crown-wheel, F, which meshes with the corresponding crown and ratchet wheel H, that is rigidly secured to the axle B, between the wheels D and C. Around the periphery of the wheel D is the cam-rib K, which is preferably of metal, and of such form and strength as to cause the necessary oscillation of the arm or lever L. The lever L is provided, at its upper extremity, with a lateral slot, in which is pivoted the head M, so arranged that it will move freely, a part of its upper surface being removed to permit of the oscillation of the lever, as well as to provide a bearing for the same. Upon the lower side of the head M are the pins N, upon which revolve the friction-rollers O, between which the rib K moves. To the lower extremity of the lever L, which is properly pivoted to the frame at X, is secured the knife or sickle. The periphery of the wheel H is in the form of a ratchet, and a pawl, *h*, attached to the wheel C, serves to control its motion, so as to prevent its revolution, thus preventing the oscillation of the lever L when the machine is being moved backward. A helical spring, P, encircles the axle B, its ends resting, respectively, against a shoulder, *b*, and the outside of the grooved projection E, being applied for the purpose of holding the wheel D in gear. A metallic fork, Q, connected with the lever R, gripes the grooved projection E, and affords an easy means of throwing the wheel D out of gear, the spur S holding the lever in position, as may be desired.

Having thus described my invention, what I claim as new, and desire to secure by Letters Patent, is—

The arrangement of the sliding cam-wheel D, loose upon the axle, and provided with the side ratchet F, the supporting and driving wheel C, loose on the axle, and provided with the pawl *h*, and the intermediate double-ratchet wheel H, fixed to the axle, spring P, and shipping-fork Q, substantially as shown and described.

In testimony that I claim the foregoing improvement in mowing-machines, as above described, I have hereunto set my hand and seal this 15th day of May, 1873.

JOHN BEACH. [L. S.]

Witnesses:
WM. C. CRUMB,
CHARLES CRUMB.